United States Patent Office 3,594,428
Patented July 20, 1971

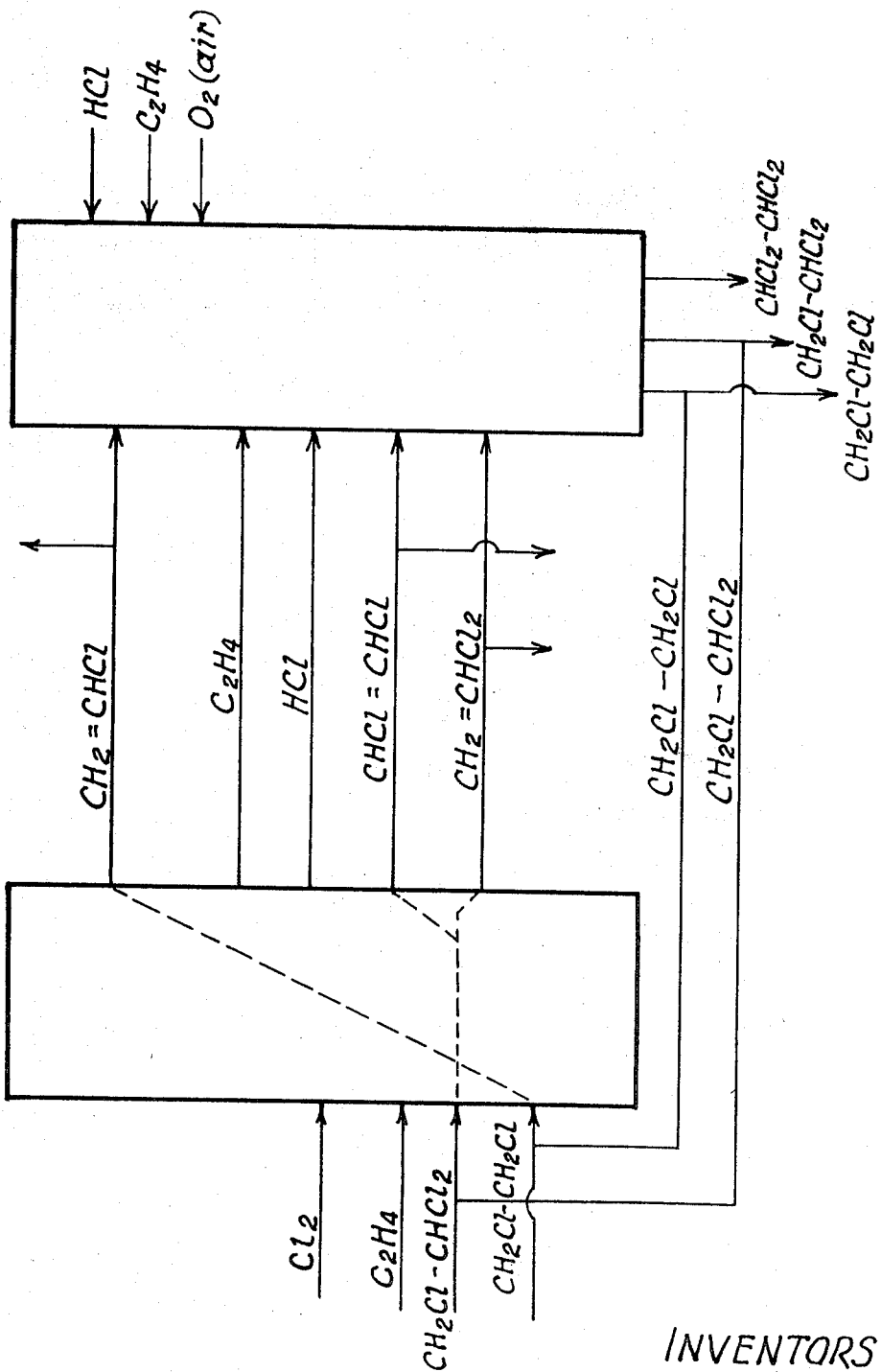

3,594,428
PROCESS FOR PREPARING 1,1-DICHLOROETHYL-
ENE, 1,2 - DICHLOROETHYLENE AND VINYL
CHLORIDE
Albert Antonini, Paris, Gustave M. Stahl, Saint-Auban, and Claude Vrillon, Montmagny, France, assignors to Produits Chimiques Pechiney-Saint-Gobain, Paris, France
Filed May 20, 1968, Ser. No. 730,446
Claims priority, application France, July 13, 1967, 114,307
Int. Cl. C07c 21/04, 21/06, 17/02, 17/04
U.S. Cl. 260—654H
22 Claims

ABSTRACT OF THE DISCLOSURE

Process of reaction of a mixture of ethylene, chlorine, 1,2-dichloroethane and 1,1,2-trichloroethane to produce 1,1-dichloroethylene, 1,2-dichloroethylenes and vinyl chloride and the combination thereof with an oxychlorination reaction which makes use of components from the dehydrochlorination reaction and which makes available components for the chlorination reaction.

---

This invention relates to a process for simultaneously producing vinyl chloride and dichloroethylenes by thermal reaction of a gaseous mixture of chlorine with ethylene and di- and trichloroethanes, and it relates further to the combination of the described thermal chlorination reaction with a subsequent oxychlorination reaction in series with the thermal chlorination reaction and which makes use of portions of the effluent from the thermal chlorination reaction to produce a reaction product, portions of which can be utilized to make up at least a part of the feed of dichloroethanes and trichloroethanes to the thermal reaction with the removal of product from the effluent of the thermal reaction and/or the oxychlorination reaction.

Description herein will first be made to the more important concept of this invention addressed to the thermal reaction of a gaseous mixture of chlorine, ethylene and the di- and trichloro $C_2$ saturated derivatives to produce a reaction product containing significant amounts of vinyl chloride, 1,2 - dichloroethylenes, 1,1 - dichloroethylene (vinylidene chloride) and gaseous hydrogen chloride, with the possible inclusion of ethylene which has not been converted or introduced in excess of the amount required for reaction in the thermal reaction zone.

It is known to prepare vinyl chloride by thermal dehydrochlorination of 1,2-dichloroethane or, more advantageously, by association of the described endothermic dehydrochlorination reaction with the exothermic chlorination of ethylene whereby the heat generated by the one reaction is utilized by the other to produce a more adiabatic system.

It is also known to prepare 1,1-dichloroethylene and 1,2-dichloroethylenes by thermal dehydrochlorination of 1,1,2-trichloroethane. Dehydrochlorination of 1,1,2-trichloroethane is also known to yield principally cis- and trans-1,2-dichloroethylenes, unless the reaction is carried out in the presence of lime whereupon 1,1-dichloroethylene becomes the principal reaction product.

Thus, by the prior art processes, it is possible to obtain vinyl chloride, 1,1-dichloroethylene and 1,2-dichloroethylenes but, for such purposes, it becomes necessary disadvantageously to dispose of a number of installations.

Another disadvantage of the described method for simultaneous production of vinyl chloride, 1,1-dichloroethylene and 1,2-dichloroethylenes arises from the fact that it is necessary either to furnish heat for the dehydrochlorination reaction or to devalorize a part of the chlorine in the form of calcium chloride.

It is also known that thermal chlorination of ethylene yields vinyl chloride, accompanied with by-products which include 1,1- and 1,2-dichloroethylenes, usually in very low amounts by comparison with vinyl chloride and which is incapable of ready adjustment. If it is desired to increase the proportion of 1,1-dichloroethylene and 1,2-dichloroethylenes by comparison with vinyl chloride, it is necessary to increase the molar ratio of $Cl_2/C_2H_4$ but then ethylene becomes subject to destructive chlorination reactions which yield carbonaceous decomposition products, such as soot, carbon, and tar-like substances.

In order to avoid this destructive chlorination of ethylene, various techniques have been proposed, all of which have the effect of lowering the partial pressure of chlorine in the gaseous reaction mixture; as by operating under low pressure; or by dilution either with an excess of ethylene and/or vinyl chloride or with an inert gas such as $N_2$, $CO$, $CO_2$ and $H_2O$ vapor; or by making use of a reactor in which the feed reactants are diluted in situ by partially reacted reaction mixture; or by subdividing the chlorine for introduction at different points of the reactor. These various techniques, designed to obtain 1,1-dichloroethylene and 1,2-dichloroethylenes in higher proportion with respect to vinyl chloride, such as a molar ratio of 1,1- and 1,2-dichloroethylenes to vinyl chloride greater than 0.2, imply a substantial dilution of the reactants, a decrease in reactor productivity, and difficulties in separating out the desirable or useful products.

When operating with a high feed molar ratio of reactants $Cl_2/C_2H_4$, such as above 0.8, a significant amount of ethylenic compounds more highly chlorinated than 1,1- and 1,2-dichloroethylenes, such as trichloroethylene and perchloroethylene, is also formed as well as chlorinated compounds containing more than 3 chlorine atoms such as 1,1,2,2 - tetrachloroethane, 1,1,1,2 - tetrachloroethane, pentachloroethane and hexachloroethane, with corresponding reduction in the yield of the desired products.

Finally, it is also known to prepare vinyl chloride by chlorination of ethylene in the presence of 1,2-dichloroethanes. Endothermic dehydrochlorination of 1,2-dichloroethanes yields additional amounts of vinyl chloride which operate further to reduce the proportional yield of 1,1- and 1,2-dichloroethylenes with respect to vinyl chloride.

It is an object of this invention to provide a process for the simultaneous preparation of a mixture of 1,1-dichloroethylene, 1,2-dichloroethylenes and vinyl chloride in a single piece of equipment, in which the proportions thereof can be varied at will within fairly wide limits by adjustment in the molar ratios of

$$(CCl_2=CH_2+CHCl=CHCl)/CH_2=CHCl$$

within the range of 0.08 to 1.4 and preferably above 0.20, which permits the reaction to be carried out with less than 0.01% by weight carbonaceous products with respect to the organic reactants involved, in which less than 5 molar percent and usually less than 3 molar percent non-utilizable compounds are produced with respect to the mixture of dichloroethylenes and vinyl chloride, in which the process is capable of high productivity, easy control of reaction temperature and high thermal efficiency. By the term non-utilizable compounds, reference is made to ethylenic chlorinated compounds containing more than 2 chlorine atoms, saturated chlorinated compounds containing more than 3 chlorine atoms, as well as chlorinated aromatic compounds.

The vinyl chloride and 1,1- and 1,2-dichloroethylenes are obtained free, or practically free, of butadiene, usually in an amount less than 2 p.p.m. by weight, thereby to make available a vinyl chloride which is suitable for polymerization.

In accordance with the practice of this invention, a gaseous mixture composed essentially of ethylene, chlorine, 1,2-dichloroethane and 1,1,2-trichloroethane is passed through a thermal reaction zone at a temperature within the range of 370° to 500° C., and preferably 400° to 440° C., and preferably after passage through a mixing zone having a temperature within the range of 80° to 300° C. The residence time for said reactants in the mixing zone should be less than 0.1 second and preferably within the range of 0.01 to 0.05 second. The residence time is calculated by the ratio of the volume of the mixing zone to the volumetric flow rate of the gaseous reactants, under the pressure and at the temperature conditions existing. If the temperature in the thermal reaction zone exceeds 500° C., an increase is experienced in the formation of by-products containg $C_3$ and $C_4$ hydrocarbons. On the other hand, when the reaction temperature falls below 370° C., such as to 350° C., the reaction yields more saturated hydrocarbons as distinguished from the unsaturated ethylene compounds. The reactants are admitted to the mixing zone preferably in two separate portions. One portion contains all of the chlorine while the other portion contains all of the ethylene. The 1,2-dichloroethane and/or the 1,1,2-trichloroethane may be contained in either of the two portions or subidivded between both. The reactants should be as dry as possible and it is important for the mixing zone to be efficient, for its purpose is to achieve a homogeneous mixture of the reactants as quickly as possible.

Variation in the proportion of 1,1-dichloroethylene, 1,2-dichloroethylenes and vinyl chloride in the effluent from the thermal reaction zone can be achieved by adjustment of the molar ratios of the reactants introduced for subsequent gaseous phase reaction, i.e.: $Cl_2/C_2H_4$

$Cl_2/(CH_2Cl—CH_2Cl+CHCl_2—CH_2Cl)$ and

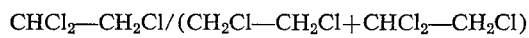

$CHCl_2—CH_2Cl/(CH_2Cl—CH_2Cl+CHCl_2—CH_2Cl)$

In accordance with the practice of this invention, the molar feed ratios of the reactants $Cl_2/C_2H_4$ is within the range of 0.4 to 2.0 and preferably 0.6 to 0.8;

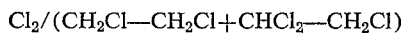

$Cl_2/(CH_2Cl—CH_2Cl+CHCl_2—CH_2Cl)$ is within the range of 0.5 to 1.5 and preferably 0.5 to 0.9, and $CHCl_2—CH_2Cl/(CH_2Cl—CH_2Cl+CHCl_2—CH_2Cl)$ is within the range of 0.05 to 0.95 and preferable 0.15 to 0.60.

The use of 1,1,2-trichloroethane as a reactant in the aforesaid limits with chlorine, ethylene and 1,2-dichloroethane makes it possible readily to adjust the molar proportions of the 1,1- and 1,2-dichloroethylenes with respect to vinyl chloride while enabling the reaction zone to operate practically adiabatically and to maintain the destructive chlorination of ethylene to the previously described low minimum. As indicated by the broken lines in the accompanying flow sheet, the proportion of vinyl chloride can be increased by increase in the proportion of 1,2-dichloroethane, while the proportion of the 1,1- and 1,2-dichloroethylenes with respect to vinyl chloride can be increased by increase in the proportion of 1,1,2-trichloroethane. Thus the reaction embodies means for variation in the proportion of one or more of the components in the reaction product by comparison with another simply by variation in the proportion of the $C_2$ saturated chlorinated compounds in the feed.

Unexpectedly, it has also been found that the use of 1,1,2-trichloroethane does not lead to a significant yield of non-utilizable compounds, such as trichloroethylene and tetrachloroethanes, perchloroethylene and pentachloroethane with respect to the desired product such as dichloroethylenes and vinyl chloride. Thus applicants have established that it is possible to keep the proportion of such non-utilizable compounds below 5 molar percent with respect to the molar amount of dichloroethylenes and vinyl chloride when the reactants are adjusted to adhere to the conditions defined by the following equation:

$$(a+b+2c+3d)<2.5(b+c+d)$$

wherein:

$a$ represents the molar flow rate of chlorine,
$b$ represents the molar flow rate of ethylene,
$c$ represents the molar flow rate of 1,2-dichloroethane, and
$d$ represents the molar flow rate of 1,1,2-trichloroethane.

While not essential, it is the preferred practice of this invention to carry out the thermal dehydrochlorination reaction under a pressure within the range of 0.3 to 10 absolute bars and preferably within the range of 1.2 to 5 absolute bars.

The residence or contact time of the reacants in the thermal reaction zone is generally maintained within the range of 0.1 to 10 seconds and preferably 1 to 4 seconds. The contact time is defined as the ratio of the volume of the reaction zone to the volumetric flow rate of the reactants calculated with the reactants in the vapor phase and under the pressure and temperature conditions for the reaction.

Under the conditions described, the chlorine introduced into the reaction zone is transformed, in quasi-totality, at a minimum of 99.5% and even up to 99.9% thereby to simplify the separation of the useful products from the effluent.

The effluent from the thermal reaction zone is thus practically free of chlorine and is composed principally of vinyl chloride, 1,1-dichloroethylene, 1,2-dichloroethylenes and hydrochloric acid as well as unreacted ethylene, 1,2-dichloroethane and 1,1,2-trichloroethane. The untransformed ethylene, 1,2-dichloroethane and 1,1,2-trichloroethane can be separated out for return as a part of the feed to the thermal reaction zone. The small amount of ethyl chloride, 1,1-dichloroethane and 1,1,1-trichloroethane produced can also, without objection, be returned for inclusion in the feed to the thermal reaction zone.

The effluent from the thermal reaction zone can be treated by means well known to the art for separation of various of its components. For example, it is beneficial first to separate the gaseous compounds, such as ethylene and hydrochloric acid, from the compounds which are condensable upon cooling and/or by washing with a solvent, such as chlorinated solvents like 1,2-dichloroethane and/or the other chlorinated products of the reaction, whereafter the vinyl chloride and dichloroethylenes are recovered by fractional distillation.

After separation of all or part of the chlorinated hydrocarbons from the effluent of the thermal reaction zone, all or part of the untransformed ethylene, the hydrochloric acid and/or the formed chlorinated hydrocarbons can be employed to advantage in an oxychlorination reaction, reference being made particularly to one or more of the oxychlorination processes which form the subject matters of the following copending U.S. patent applications: S.N. 730,606, S.N. 730,611, S.N. 730,609, S.N. 730,651, S.N. 730,608, S.N. 730,617, S.N. 730,664, S.N. 730,604 and S.N. 730,605 all of which have been filed in the United States Patent Office concurrently herewith and which are entitled "Oxychlorination of Ethylene with a Fixed Bed Catalyst," "Preparation of $C_2$ Saturated Chlorinated Compounds by Oxychlororination of Ethylene and Vinyl Chloride with a Fluid Bed Catalyst," "Oxychlorination of Ethylene and Vinyl Chloride Mixtures," "1,1,2,2-tetrachloroethane Prepared by Oxychlorination of Dichloroethylenes," "Preparation of 1,2-Dichloroethane and 1,1,2,2-tetrachloroethane by Oxychlorination," "Trichloroethylene Prepared by Oxychlorination of Vinyldene Chloride," and "Trichloroethylene and Dichloroethylenes Prepared by Oxychlorination." Such oxychlorination reactions which utilize portions of the reaction products from the effluent of the thermal reaction zone yield chlorinated derivatives of ethylene and/or of ethane, such as 1,2-dichloroethane, 1,1,2-trichloroethane, which can be returned alone or together as part of the feed to the thermal reaction zone to produce the 1,1-dichloroethylene, 1,2-dichloroethylenes and vinyl chloride in accordance with the described practice of this invention, whereby one reaction supplements the other to provide an efficient, continuous process from which desired products can be recovered at high yields.

In effect, the processes of the aforementioned applications are adaptable to the oxychlorination reaction which makes use of compounds obtained from the thermal reaction zone with a view towards preparing chlorinated derivatives of ethane and/or ethylene which find use as solvents or as raw materials for the preparation of solvents.

By way of a practical modification of this invention, the thermal dehydrochlorination reaction can be carried out in the presence of a small quantity of oxygen, preferably less than 3 molar percent with respect to the amount of chlorine. It is also possible to carry out the reaction in the presence of an inert gas such as CO, $CO_2$, $N_2$ and argon.

The following examples are given by way of illustration, but not by way of limitation, of the practice of this phase of the invention:

EXAMPLE I

Chlorine (37.8 moles/h.) preheated to 260° C., on the one hand, and ethylene (56.5 moles/h.), 1,2-dichloroethane (32.3 moles/h.) and 1,1,2-trichloroethane (11.1 moles/h.) preheated to 260° C., on the other hand, are introduced into a mixing device. The residence time of the reactants in the mixing zone is 0.03 second and the molar ratios of $Cl_2/C_2H_4$,

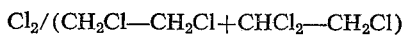

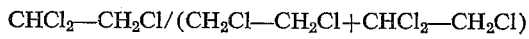

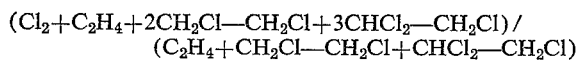

are approximately 0.67, 0.87, 0.256 and 1.92 respectively. The reactants are introduced into a reaction zone formed of a cylindrical nickel reactor having a volume of 5 liters and free of any filling material. The reaction zone temperature is raised to normal operating temperature of about 440° C. and the preferred pressure is 1.5 absolute bars. The contact time of the reactants in the reaction zone is about 3.4 seconds.

At the exit of the reactor, there is obtained continuously an effluent having the following composition, expressed in moles per hour:

| | |
|---|---|
| Vinyl chloride | 48.91 |
| Cis- and trans-1,2-dichloroethylenes | 8.76 |
| 1,1 - dichloroethylene | 6.38 |
| Ethylene | 29.70 |
| 1,2 - dichloroethane | 1.61 |
| 1,1,2 - trichloroethane | 2.7 |
| Ethyl chloride | 0.1 |
| 1,1 - dichloroethane | 0.1 |
| 1,1,2,2 - tetrachloroethane | 0.05 |
| Trichloroethylene | 0.79 |
| Perchloroethylene | 0.19 |
| Unidentified heavy products | [1] 0.5 |
| Hydrochloric acid | 76.0 |

The effluent is cooled to 0° C. partially to condense the organic chlorinated compounds. The uncondensed effluent is washed in a column at 0° C. with 1,2-dichloroethane in countercurrent flow. The condensate and the liquid from the washing column are mixed and submitted to fractional distillation. At the head of the column, raw vinyl chloride is recovered with hydrochloric acid as the main impurity and ethylene as light products and ethyl chloride and vinylidene chloride as heavier products. The purification of vinyl chloride is carried out by bleeding off and a tailing off, thus enabling vinyl chloride to be obtained with a separation yield of 98% to 99% having less than 2 p.p.m. by weight butadiene and which is suitable for use in polymerization.

The organic products, freed of vinyl chloride, are redistilled in order to obtain at the top of the column a mixture of vinylidene chloride, cis- and trans-dichloroethylenes with a separation yield of 97%. It follows, from the composition of the aforementioned effluent, that the molar ratio $(CHCl=CHCl+CCl_2=CH_2)/CHCl=CH_2$ is equal to 0.31 and that the total transformation rates of ethylene, 1,2-dichloroethane and 1,1,2-trichloroethane are respectively 47.3%, 95.0% and 75.7%.

The proportion of untransformed chlorine is below 0.001% with respect to the chlorine feed. No formation of carbonaceous products was observed and the proportion of non-utilizable chlorinated by-products did not exceed 2.4 molar percent with respect to the vinyl chloride and the three dichloroethylene isomers produced.

EXAMPLE II

Chlorine (24 moles/h.) preheated to 200° C., on the one hand, and ethylene (38.5 moles/h.), 1,2-dichloroethane (14.65 moles/h.) and 1,1,2-trichloroethane (14.25 moles/h.) preheated to 215° C., on the other hand, are introduced into the mixing zone. The residence time of the reactants in the mixing zone is 0.04 second. The molar ratios of the reactants are: $Cl_2/C_2H_4=0.625$;

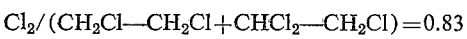

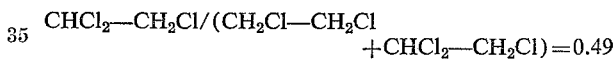

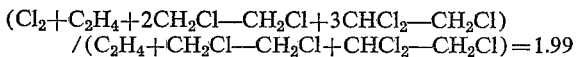

The admixed reactants are then introduced into a reaction zone formed of a cylindrical reactor of Inconel (73% Ni) having a diameter of 100 mm. and a length of 250 mm. and which is free of any filler. The maximal temperature of the reaction zone is raised to the normal operating temperature of about 415° C. and the preferred pressure is 4 absolute bars. The contact time of the reactants in the reaction zone is about 5.5 seconds.

At the exit of the reaction zone, a continuous flow of effluent is obtained having the following composition, expressed in moles per hour:

| | |
|---|---|
| Vinyl chloride | 23.85 |
| Cis- and trans-1,2-dichloroethylene | 8.52 |
| 1,1-dichloroethylene | 5.38 |
| Ethylene | 21.37 |
| 1,2-dichloroethane | 2.8 |
| 1,1,2-trichloroethane | 4.49 |
| Tetrachloroethanes | 0.30 |
| Trichloroethylene | 0.38 |
| Perchloroethylene | 0.07 |
| Ethyl chloride | 0.01 |
| 1,1-dichloroethane | 0.02 |
| 1,1,1-trichloroethane | 0.01 |
| Unidentified heavy products | [1] 0.2 |
| Hydrochloric acid | 45.0 |

[1] If assimilated to hexachloroethane.

The separation of vinyl chloride and dichloroethylenes from the effluent is carried out as in Example I.

The formation of carbonaceous products is only 0.002% by weight with respect to the organic reactants involved.

The proportion of untransformed chlorine is below 0.001% with respect to the chlorine feed. The proportion of non-utilizable by-products does not exceed 2.5 molar percent based upon the vinyl chloride and the three dichloroethylene isomers produced. The total transformation rates of ethylene, 1,2-dichloroethane and 1,1,2-trichloroethane respectively are 44.5%, 80% and 68.5%.

The molar ratio of the desired products 1,1-dichloroethylene+1,2-dichloroethylenes to vinyl chloride is equal to 0.58.

By way of comparison, a chlorination reaction was carried out with a view towards obtaining the same molar ratio of 1,1-dichloroethylene+1,2-dichloroethylenes to vinyl chloride equal to 0.58 but without including 1,1,2-trichloroethane in the feed, using the same mixing system and the same reactor as in Example II.

For this purpose, there is passed into the mixing device, on the one hand, chlorine (40.5 moles/h.) preheated to 150° C. and, on the other hand, ethylene (9.15 moles/h.) and 1,2-dichloroethane (40.85 moles/h.) preheated to 150° C. The residence time of the reactants in the mixing zone is 0.04 second. The molar ratios of the reactants are as follows: $Cl_2/C_2H_4=4.42$;

$$(Cl_2+C_2H_4+2CH_2Cl-CH_2Cl)/(C_2H_4+CH_2Cl-CH_2Cl)=2.63$$

The admix reactants are then introduced into a reactor free of any filling material. The maximal reaction zone temperature during normal operation is 415° C. and the pressure is 4 absolute bars. The contact time of the reactants in the reaction zone is about 5.5 seconds.

At the reactor exit, an effluent is obtained having the following composition, expressed in moles per hour:

| | |
|---|---|
| Vinyl chloride | 24.15 |
| Cis- and trans-1,2-dichloroethylene | 8.35 |
| 1,1-dichloroethylene | 6.65 |
| Ethylene | 0.8 |
| 1,2-dichloroethane | 2.0 |
| 1,1,2-trichloroethane | 2.58 |
| Ethyl chloride | 0.02 |
| 1,1-dichloroethane | 0.05 |
| Tetrachloroethanes | 1.96 |
| Trichloroethylene | 1.02 |
| Perchloroethylene | 0.14 |
| Unidentified heavy products | [1] 2.65 |
| Hydrochloric acid | 72.5 |

[1] If assimilated to hexachloroethane.

The chlorine conversion rate is 99.7%. However, the formation of carbonaceous products is relatively significant in the order of 0.3% by weight with respect to the organic reactants involved. Furthermore, the formation of non-utilizable by-products, within the scope of this process, is considerable and rises to about 14.7 molar percent with respect to the vinyl chloride and the three dichloroethylene isomers in the effluent. These undesirable by-products include ethylenic chlorinated derivatives more highly chlorinated than dichloroethylenes, such as trichloroethylene and perchloroethylene, and chlorinated derivatives of ethane more highly chlorinated than trichloroethane, such as tetrachloroethanes, pentachloroethane, and hexachloroethane, as well as chlorinated derivatives of benzene.

The comparison of this reaction with that of Example II shows the advantage derived from the presence of 1,1,2-trichloroethane (and possibly that of its isomer) in the feed of reactants in accordance with the practice of this invention. The use of 1,1,2-trichloroethane enables the formation of carbonaceous products to be reduced to 0.002% and to limit the proportion of chlorinated by-products to 2.5 molar percent.

EXAMPLE III

By using the mixing device and the reactor of Example II, there is passed into the mixer, on the one hand, chlorine (29.5 moles/h.) and, on the other hand, ethylene (40 moles/h.), 1,2-dichloroethane (2 moles/h.) and 1,1,2-trichloroethane (25.2 moles/h.), the reactants being preheated to 240° C. The residence time of the reactants in the mixing zone is 0.04 second and the molar ratios of the reactants are as follows: $Cl_2/C_2H_4=0.74$; $Cl_2/(CH_2Cl-CH_2Cl+CHCl_2-CH_2Cl)=1.08$;

$$CHCl_2-CH_2Cl/(CH_2Cl-CH_2Cl+CHCl_2-CH_2Cl)=0.93$$

$$(Cl_2+C_2H_4+2CH_2Cl-CH_2Cl+3CHCl_2-CH_2Cl)/(C_2H_4+CH_2Cl-CH_2Cl+CHCl_2-CH_2Cl)=2.22$$

The admixed reactants are introduced into the reactor under a pressure of 1.9 absolute bars and the maximal temperature is about 440° C. The contact time of the reactants in the reaction zone is about 2.4 seconds.

At the exit of the reactor, a continuous flow of effluent is recovered having the following composition, expressed in moles per hour:

| | |
|---|---|
| Vinyl chloride | 17.3 |
| Cis- and trans-1,2-dichloroethylene | 12.8 |
| 1,1-dichloroethylene | 10.8 |
| Ethylene | 19.0 |
| 1,2-dichloroethane | 0.4 |
| 1,1,2-trichloroethane | 5.15 |
| 1,1,2,2-tetrachloroethane | 0.42 |
| Trichloroethylene | 0.38 |
| Ethyl chloride | 0.1 |
| 1,1,1-trichloroethane | 0.05 |
| Unidentified heavy products | [1] 0.8 |
| Hydrochloric acid | 49.8 |

[1] If calculated as hexachloroethane.

Vinyl chloride and dichloroethylenes are separated from the effluent in the manner described in Example I. Although the molar ratio of 1,2-dichloroethylenes and 1,1-dichloroethylene to vinyl chloride is a relatively high 1.36, the formation of non-utilizable by-products is only 3.9 molar percent with respect to the vinyl chloride and the three dichloroethylene isomers produced. During this test, only traces of carbonaceous products are formed (less than 0.001% by weight with respect to the organic reactants involved).

The proportion of untransformed chlorine is below 0.001% with respect to the chlorine involved. The total transformation rates of ethylene, 1,2-dichloroethane and 1,1,2-trichloroethane are respectively 52.5%, 80% and 80%.

EXAMPLE IV

There is passed into the mixing device of Example II, chlorine in the amount of 39.7 moles/h. preheated to 210° C. and ethylene (52.9 moles/h.), 1,2-dichloroethane (36.1 moles/h.) and 1,1,2-trichloroethane (11 moles/h.) preheated to 230° C. The residence time of the reactants in the mixing zone is 0.04 second and the molar ratios of the reactants are as follows: $Cl_2/C_2H_4=0.75$;

$$Cl_2/(CH_2Cl-CH_2Cl+CHCl_2-CH_2Cl)=0.84$$

$$CHCl_2-CH_2Cl/(CH_2Cl-CH_2Cl+CHCl_2-CH_2Cl)=0.23$$

$$(Cl_2+C_2H_4+2CH_2Cl-CH_2Cl+3CHCl_2-CH_2Cl)/(C_2H_4+CH_2Cl-CH_2Cl+CHCl_2-CH_2Cl)=1.98$$

The admixed reactants are introduced into a reaction zone formed of a reactor made of Incoloy (78% Ni) having a volume of 1.5 liters and which is free of any filling.

The maximal temperature of the reaction zone is raised to normal operating temperature of about 400° C. and the pressure therein is 3 absolute bars. The contact time of the reactants in the reaction zone is about 2.1 seconds.

The effluent from the reactor has the following composition, expressed in moles per hour:

| | |
|---|---|
| Vinyl chloride | 41 |
| Cis- and trans-1,2-dichloroethylene | 7.05 |
| 1,1-dichloroethylene | 4.74 |
| Ethylene | 27.9 |
| 1,2-dichloroethane | 8.62 |
| 1,1,2-trichloroethane | 8.06 |
| 1,1,2,2-tetrachloroethane | 0.6 |
| Trichlorethylene | 0.95 |
| Perchlorethylene | 0.2 |
| Ethyl chloride | 0.1 |
| 1,1-dichloroethane | 0.07 |
| 1,1,1-trichloroethane | 0.1 |
| Unidentified heavy products | [1] 0.51 |
| Hydrochloric acid | 68.0 |

[1] If calculated on hexachloroethane.

The proportion of untransformed chlorine is less than 0.001% with respect to the chlorine feed. No formation of carbonaceous products is observed. The formation of non-utilizable by-products is only about 4.6 molar percent.

The reactor effluent is fractionated into several portions by means of absorbing columns and distillation columns. One of the portions containing all of the hydrochloric acid, ethylene and a small amount of vinyl chloride (0.1 mole/h.) and vinylidene chloride (0.05 mole/h.), after addition of 3.8 moles/h. of ethylene and 18 moles/h. of oxygen in the form of air, is subjected to an oxychlorination reaction with a fluidized bed catalyst in accordance with the process described in S.N. 730,611 entitled "Preparation of $C_2$ Saturated Chlorinated Compounds by Oxychlorination of Ethylene and Vinyl Chloride with a Fluid Bed Catalyst."

At the exit of the oxychlorination reactor, an effluent is recovered having the following composition, expressed in moles per hour:

| | |
|---|---|
| 1,2-dichloroethane | 27.6 |
| 1,1,2-trichloroethane | 3 |
| 1,1,2,2-tetrachloroethane | 0.3 |
| Vinyl chloride | 0.2 |
| 1,1-dichloroethylene; 1,2-dichloroethylenes | 0.1 |
| $CO_2$ | 0.15 |
| CO | 0.03 |
| Ethylene | 0.41 |

The transformation rates of ethylene and of hydrochloric acid in the oxychlorination reaction are respectively 98.7% and 97%.

Another portion of effluent from the thermal chlorination reaction, which corresponds to the fraction containing the quasi-totality of 1,2-dichloroethane (8.5 moles/h.) and 1,1,2-trichloroethane (8.0 moles/h.), which have not been transformed, is recycled for addition to the 1,2-dichloroethane and 1,1,2-trichloroethane recovered from the effluent of the oxychlorination reaction for feed to the thermal chlorination reaction zone.

Under these conditions, the production of vinyl chloride is 40.5 moles/h. and that of 1,1- and 1,2-dichloroethylenes is 11.6 moles/h. The conversion rate of ethylene into vinyl chloride and into dichloroethylenes, in the overall process, is 91.9%.

As illustrated in Example IV, a further concept of this invention resides in the joinder of an oxychlorination reaction in series with the thermal chlorination reaction described wherein the thermal chlorination reaction makes available hydrochloric acid, essential to the oxychlorination reaction, along with one or more of the components vinyl chloride, 1,2-dichloroethylenes, 1,1-dichloroethylene and unconverted ethylene, after the desired product or products have been removed in whole or in part from the effluent of the thermal chlorination reaction zone, and wherein the oxychlorination reaction makes available 1,2-dichloroethane and/or 1,1,2-trichlorethane for use as a part of the feed to the thermal dehydrochlorination reaction after the desired product or products have been removed, thereby to make most efficient utilization of the compounds generated during such reactions.

The foregoing concepts will be briefly illustrated by the following examples, reference being made to the flow diagram forming a part of this specification.

In S.N. 730,604 entitled "Fluid Bed Oxychlorination of Ethylene," the feed to the oxychlorination reaction zone is formed of a gaseous mixture of ethylene, hydrochloric acid and a molecular oxygen containing gas for passage through the catalytic reaction zone at a temperature within the range of 280° to 370° C., using a fluidized bed catalyst, with the reactants being present in the gaseous feed mixture in the molecular feed ratio of $O_2/C_2H_4$ within the range of 0.63 to 0.9 and preferably 0.7 to 0.85, $HCl/O_2$ within the range of 2.60 to 4.30 and $HCl/C_2H_4$ within the range of 2.10 to 3.05, with a molecular feed rate, based upon ethylene, within the range of 0.5 to 20 moles/hour per liter of catalyst.

For this purpose, the hydrochloric acid and unconverted ethylene in the effluent from the thermal reaction zone is utilized as a part of the feed to the catalytic reaction zone of the oxychlorination reaction, leaving vinyl chloride, 1,1-dichloroethylene and 1,2-dichloroethylenes, as produced from the dehydrochlorination reaction. Oxygen, in the form of air, and additional ethylene can be introduced in amounts for admixture with the components derived from the thermal reaction zone to provide the described ratio of reactants.

The effluent from the oxychlorination reaction comprises 1,2-dichloroethane, 1,1,2-trichloroethane and 1,1,2,2-tetrachloroethane, thus making 1,2-dichloroethane and 1,1,2-trichloroethane available for use as a part of the feed to the described thermal dehydrochlorination reaction, leaving 1,1,2,2-tetrachloroethane and such parts of the 1,2-dichloroethane and 1,1,2-trichloroethane, as desired, as product.

In S.N. 730,611 entitled "Preparation of $C_2$ Saturated Chlorinated Compounds by Oxychlorination of Ethylene and Vinyl Chloride with a Fluid Bed Catalyst," the feed to the oxychlorination reaction is formed of a gaseous mixture of ethylene and vinyl chloride, hydrochloric acid and a molecular oxygen containing gas.

Ethylene is present in an amount within the range of 15 to 93 molar percent of the total vinyl chloride and ethylene mixture. The gaseous mixture is passed through a catalytic reaction zone which makes use of a fluidized catalyst at a temperature within the range of 300° to 370° C. and preferably at a pressure of 1 to 10 absolute bars, with the molecular ratio of reactants

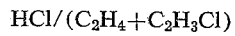

$$HCl/(C_2H_4+C_2H_3Cl)$$

within the range of 2.0 to 3.0, $O_2/(C_2H_4+C_2H_3Cl)$ within the range of 0.6 to 1.5, and $HCl/O_2$ within the range of 2.0 to 3.3, at a feed flow rate, based upon the ethylene and vinyl chloride, within the range of 0.5 to 20 moles per hour per liter of catalyst.

The effluent from the thermal dehydrochlorination reaction is treated to effect removal of 1,2-dichloroethylenes and 1,1-dichloroethylene, leaving hydrochloric acid, vinyl chloride and unconverted ethylene for circulation as a part of the feed to the oxychlorination reaction. Oxygen and any deficiencies of ethylene and vinyl chloride can be separately added to provide a feed containing the reactants in the described ratio for oxychlorination in the catalytic reaction zone.

The effluent from the catalytic reaction zone contains 1,2-dichloroethane, 1,1,2-trichloroethane, 1,1,2,2-tetrachloroethane and pentachloroethane, thus making 1,2-dichloroethane and 1,1,2-trichloroethane, which can be separated for use as a part of the feed to the described thermal chlorination reaction, leaving 1,1,2,2-tetrachloroethane and pentachloroethane as product from the oxychlorination reaction as well as 1,1- and 1,2-dichloroethylenes as product from the thermal chlorination reaction plus any vinyl chloride, 1,2-dichloroethane and 1,1,2-trichloroethane not included in the feed.

In S.N. 730,609 entitled "Oxychlorination of Ethylene and Vinyl Chloride Mixtures," the feed to the oxychlorination reaction zone is formed of a gaseous mixture of ethylene and vinyl chloride, hydrochloric acid and a molecular oxygen containing gas with the ethylene present in the range of 20 to 93 molar percent of the total vinyl chloride and ethylene. The gaseous mixture is passed through the catalytic reaction zone, using a fixed bed catalyst, at a temperature within the range of 340° to 420° C. with the reactants present in the ratio of $$HCl/(C_2H_4+C_2H_3Cl)$$

within the range of 2.0 to 3.0, $O_2/(C_2H_4+C_2H_3Cl)$ within the range of 0.6 to 1.5, and a feed flow rate based upon the total of ethylene and vinyl chloride of 2 to 12 moles per hour per liter of catalyst.

The effluent from the thermal chlorination reaction is treated to effect removal of 1,2-dichloroethylenes and 1,1-dichloroethylene, leaving the hydrochloric acid, vinyl chloride and untransformed ethylene for addition to make up a part of the feed to the oxychlorination reaction zone. Oxygen and any deficiencies in ethylene and vinyl chloride can be added to provide a feed containing the reactants in the described ratio for oxychlorination.

The effluent from the catalytic reaction zone will contain 1,2-dichloroethane, 1,1,2-trichloroethane, 1,1,2,2-tetrachloroethane and pentachloroethane. All or part of the 1,2-dichloroethane and 1,1,2-trichloroethane can be separated out for addition to the feed to the thermal dehychlorination reaction, leaving the remainder as product from the oxychlorination reaction along with the dichloroethylenes and such amounts of vinyl chloride as are not used from the thermal chlorination reaction, as product.

In S.N. 730,608 entitled "Preparation of 1,2-Dichloroethane and 1,1,2,2 - Tetrachloroethane by Oxychlorination," the feed to the oxychlorination reaction is formed of ethylene and dichloroethylenes, hydrochloric acid and a molecular oxygen containing gas in which the ethylene makes up 40 to 90 molar percent of the mixture of ethylene and dichloroethylenes. The gaseous mixture is passed through the catalytic reaction zone in the presence of a fluidized catalyst, at a temperature within the range of 200° to 360° C. with the reactants present in the ratio of hydrochloric acid to the total of the ethylene and dichloroethylenes within the range of 1.6 to 2.4, oxygen to the total of ethylene and dichloroethylenes within the range of 0.4 to 0.7, at a feed flow rate based upon the total of ethylene and dichloroethylenes within the range of 0.5 to 20 moles per hour per liter of catalyst.

For this reaction, the effluent from the thermal dehydrochlorination reaction is treated to effect removal of vinyl chloride and 1,1-dichloroethylene as product and to make available all or part of the 1,2-dichloroethylenes and unconverted ethylene for feed to the oxychlorination reaction along with additional air or other oxygen containing gas and ethylene sufficient to provide the desired feed ratio of reactants.

The effluent from the oxychlorination reaction contains 1,2 - dichloroethane and 1,1,2,2-tetrachloroethane. The latter is separated out as product leaving 1,2-dichloroethane for return, in whole or in part, as a part of the feed to the thermal chlorination reaction.

It will be apparent from the foregoing that there is provided a new and efficient process for thermal dehydrochlorination which makes use of a reaction mixture of chlorine, ethylene, 1,2-dichloroethane and 1,1,2-trichloroethane as feed to produce a reaction product containing vinyl chloride, 1,2 - dichloroethylenes and 1,1-dichloroethylene more easily separable from and of sufficient purity to enable use of the vinyl chloride, for example, in polymerization reactions and which includes the combination of the described dehydrochlorination reaction with an oxychlorination reaction in series whereby unreacted components and reaction compounds are made available from one reaction for use with the other for most efficient utilization of the raw materials.

It will be understood that changes may be made in the details of formulation and operation without departing from the spirit of the invention, especially as defined in the following claims.

We claim:
1. A process for the preparation of 1,1-dichloroethylene, 1,2-dichloroethylenes and vinyl chloride comprising the steps of passing ethylene, chlorine, 1,2-dichloroethane and 1,1,2-trichloroethane in molar ratios of $Cl_2/C_2H_4$ within the range of 0.4 to 2.0 and

$$Cl_2/(CH_2Cl-CH_2Cl+CHCl_2-CH_2Cl)$$

within the range of 0.5 to 1.5 through a mixing zone maintained at a temperature within the range of 80–300° C. with the residence time in the mixing zone of less than 0.1 second to mix and preheat the reactants and, advancing the resulting mixture through a thermal chlorination and dehydrochlorination reaction zone in which the maximal temperature is within the range of 370–500° C., and the contact time within the range of 0.1 to 10 seconds, and separating the desired products.

2. The process as claimed in claim 1 which includes the combination of an oxychlorination reaction following in sequence with the thermal chlorination reaction of claim 1, in which the effluent from the thermal reaction zone includes hydrochloric acid, unconverted ethylene, vinyl chloride, 1,2-dichloroethylenes and 1,1-dichloroethylene, treating the effluent from the thermal reaction zone to separate out at least a part of the hydrochloric acid, unreacted ethylene and portions of the vinyl chloride and dichloroethylenes and recovering the desired products, passing the separated portions through an oxychlorination reaction zone with molecular oxygen-containing gas and additions of ethylene and chlorinated hydrocarbons wherein the molar ratios of reactants of $HCl/(C_2H_4+C_2H_3Cl)$ is within the range of 2.0 to 3.0, $O_2/(C_2H_4+C_2H_3Cl)$ is within the range of .6 to 1.5 and $HCl/O_2$ is within the range of 2.0 to 3.3 at a flow rate of 0.5 to 20 moles per hour per liter of catalyst based upon ethylene and vinyl chloride separating at least a part of the 1,2-dichloroethane and 1,1,2-trichloroethane, and adding the separated portions as a part of the feed to the thermal dehydrochlorination reaction zone.

3. The process as claimed in claim 1 in which the residence time of the reactants in the mixing zone is within the range of 0.01 to 0.05 second.

4. The process as claimed in claim 1 in which the reactants are introduced into the mixing zone in separate portions one of which contains all of the chlorine and the other of which contains all of the ethylene, with the remainder of the components in one or the other or both of the portions.

5. The process as claimed in claim 1 in which the feed molar ratio of $Cl_2/C_2H_4$ is within the range of 0.6 to 0.8.

6. The process as claimed in claim 1 in which the feed molar ratio of $Cl_2/(CH_2Cl-CH_2Cl+CHCl_2-CH_2Cl)$ is within the range of 0.5 to 0.9.

7. The process as claimed in claim 1 in which the molar ratio of 1,1,2-trichloroethane to the total of 1,2-dichloroethane and 1,1,2-trichloroethane is within the range of 0.05 to 0.95.

8. The process as claimed in claim 1 in which the molar ratio of 1,1,2-trichloroethane to the total of 1,2-dichloroethane and 1,1,2-trichloroethane is within the range of 0.15 to 0.60.

9. The process as claimed in claim 1 in which the reactants are adjusted to the ratio corresponding to the following equation:

$$(a+b+2c+3d)<2.5(b+c+d)$$

wherein:

$a$ represents the molar flow rate of chlorine
$b$ represents the molar flow rate of ethylene
$c$ represents the molar flow rate of 1,2-dichloroethane, and
$d$ represents the molar flow rate of 1,1,2-trichloroethane.

10. The process as claimed in claim 1 in which the thermal reaction is carried out under a pressure within the range of .3 to 10 absolute bars.

11. The process as claimed in claim 1 in which the thermal reaction is carried out under a pressure within the range of 1.2 to 5 absolute bars.

12. The process as claimed in claim 1 in which the contact time of the reactants during passage through the thermal reaction zone is within the range of 1 to 4 seconds.

13. The process as claimed in claim 1 in which the temperature in the reaction zone is within the range of 400° to 440° C.

14. The process as claimed in claim 1 in which the molar ratio of dichloroethylenes to vinyl chloride in the reaction product is within the range of 0.08 to 1.4.

15. The process as claimed in claim 1 in which the molar ratio of dichloroethylenes to vinyl chloride in the reaction product is above 0.2.

16. The process as claimed in claim 1 in which the reaction product in the effluent from the thermal reaction zone contains less than 0.01 molar percent carbonaceous products based upon the total of vinyl chloride and dichloroethylenes.

17. The process as claimed in claim 1 in which the reaction product in the effluent from the thermal reaction zone contains less than 5 molar percent non-utilizable products based upon the total of vinyl chloride and dichloroethylenes in the effluent.

18. A process as claimed in claim 1, which includes an oxychlorination reaction in a cycle with the thermal chlorination and dehydrochlorination reaction in which the effluent from the thermal reaction includes hydrochloric acid, untransformed ethylene, 1,1-dichloroethylene, 1,2-dichloroethylenes, and vinyl chloride, treating the effluent from the thermal reaction to remove hydrochloric acid and untransformed ethylene, combining the hydrochloric acid and untransformed ethylene with a molecular oxygen containing gas and such amounts of hydrochloric acid and ethylene to provide a molecular feed ratio of $O_2/C_2H_4$ within the range of 0.63 to 0.9, $HCl/O_2$ within the range of 2.60 to 4.30, and $HCl/C_2H_4$ within the range of 2.10 to 3.05, passing the gaseous mixture through a catalytic oxychlorination reaction zone at a temperature within the range of 280° to 370° C. in the presence of a fluidized bed catalyst and at a molar feed rate, based upon ethylene, within the range of 0.5 to 20 moles per hour per liter of catalyst to produce an effluent containing 1,2-dichloroethane, 1,1,2-trichloroethane and 1,1,2,2-tetrachloroethane, separating at least a part of the 1,2-dichloroethane and/or 1,1,2-trichloroethane from the effluent, and recycling the separated portion to make up a part of the feed to the thermal reaction zone.

19. A process as claimed in claim 1 which includes an oxychlorination reaction in cycle with the thermal chlorination and dehydrochlorination reaction in which the effluent from the thermal reaction includes hydrochloric acid, untransformed ethylene, 1,1-dichloroethylene, 1,2-dichloroethylenes and vinyl chloride, treating the effluent from the thermal reaction zone to separate hydrochloric acid, unconverted ethylene and at least a part of the vinyl chloride, combining the separated materials with a molecular oxygen containing gas and such amount of additional hydrochloric acid, vinyl chloride and ethylene to provide a gaseous feed ratio of $HCl/(C_2H_4+C_2H_3Cl)$ within the range of 2.0 to 3.0, $O_2/(C_2H_4+C_2H_3Cl)$ within the range of 0.6 to 1.5 and $HCl/O_2$ within the range of 2.0 to 3.3 with the ethylene present in the range of 15 to 93 molar percent of the total vinyl chloride and ethylene mixture, passing the gaseous mixture through a catalytic oxychlorination reaction zone at a temperature within the range of 300° to 370° C. and at a feed flow rate, based upon ethylene and vinyl chloride, of 0.5 to 20 moles per hour per liter of catalyst in the presence of a fluidized bed catalyst to produce a reaction product containing 1,2-dichloroethane, 1,1,2-trichloroethane and 1,1,2,2-tetrachloroethane, separating at least a part of the 1,2-dichloroethane and/or 1,1,2-trichloroethane from the effluent and cycling the separated portion to make up a part of the feed to the thermal reaction zone.

20. A process as claimed in claim 1 which includes an oxychlorination reaction in cycle with the thermal chlorination and dehydrochlorination reaction in which the effluent from the thermal reaction includes hydrochloric acid, untransformed ethylene, 1,1-dichloroethylene, 1,2-dichloroethylenes and vinyl chloride, treating the effluent from the thermal reaction to separate hydrochloric acid, unconverted ethylene and at least a part of the vinyl chloride, combining the separated components with a molecular oxygen containing gas and additional amounts of hydrochloric acid, vinyl chloride, and ethylene sufficient to provide a gaseous molar ratio of $HCl/(C_2H_4+C_2H_3Cl)$ within the range of 2.0 to 3.0, $O_2/(C_2H_4+C_2H_3Cl)$ within the range of 0.6 to 1.5, and in which the ethylene is present in the range of 20 to 93 molar percent of the total vinyl chloride and ethylene, passing the gaseous mixture through a catalytic oxychlorination reaction zone at a temperature within the range of 340° to 420° C. at a feed flow rate, based upon ethylene and vinyl chloride, within the range of 2 to 12 moles per hour per liter of catalyst, using a fixed bed catalyst, to produce a reaction product containing 1,2-dichloroethane, 1,1,2-trichloroethane, 1,1,2,2-tetrachloroethane and pentachloroethane, separating at least a part of the 1,2-dichloroethane and/or 1,1,2-trichloroethane from the effluent and cycling the separated portion to make up a part of the feed to the thermal reaction zone.

21. A process as claimed in claim 1 which includes an oxychlorination reaction in cycle with the thermal chlorination and dehydrochlorination reaction in which the effluent from the thermal reaction includes hydrochloric acid, untransformed ethylene, 1,1-dichloroethylene, 1,2-dichloroethylenes and vinyl chloride, treating the effluent from the thermal reaction zone to separate hydrochloric acid, unconverted ethylene and at least a part of the dichloroethylene and vinyl chloride, combining the separated components with a molecular oxygen containing gas and additional amounts of hydrochloric acid, dichloroethylenes and ethylene to provide a molecular feed ratio of hydrochloric acid to the total of ethylene and dichloroethylenes within the range of 1.6 to 2.4, oxygen to the total of ethylene and dichloroethylenes within the range of 0.4 to 0.7 with the ethylene present in an amount within the range of 40 to 90 molar percent of the total of ethylene and dichloroethylenes, passing the gaseous mixture through a catalytic reaction zone at a temperature within the range of 200° to 360° C. at a feed flow rate of 0.5 to 20 moles per hour per liter of catalyst in the presence of a fluidized bed catalyst to produce a reaction product containing 1,2-dichloroethane and 1,1,2,2-tetrachloroethane, separating at least a part of the 1,2-dichloroethane and cycling the separated portion to make up a part of the feed to the thermal reaction zone.

22. A process for the preparation of 1,1-dichloroethylene, 1,2-dichloroethylenes and vinyl chloride comprising the steps of passing ethylene, chlorine, 1,2-dichloroethane and 1,1,2-trichloroethane in amounts corresponding to the following relationship $$\frac{(a+b+2c+3d)}{(b+c+d)} < 2.5$$

wherein $a$ represents the molar flow rate of chlorine, $b$ represents the molar flow rate of ethylene, $c$ represnts the molar flow rate of 1,2-dichloroethane and $d$ represents the molar flow rate of 1,1,2-trichloroethane through a mixing zone maintained at a temperature within the range of 80–300° C. with a residence time in the mixing zone of less than 0.1 second to mix and preheat the reactants, advancing the resulting mixture through a thermal chlorination and dehydrochlorination reaction zone in which the maximal temperature is within the range of 370–500° C., and the contact time is within the range of 0.1 to 10 seconds, and separating the desired products.

References Cited

UNITED STATES PATENTS

| | | | |
|---|---|---|---|
| 2,167,927 | 8/1939 | Groll et al. | 260—656 |
| 2,547,139 | 4/1951 | Randall | 260—654(H) |
| 2,859,254 | 11/1958 | Eisenlohr | 260—654(D) |
| 3,115,529 | 12/1963 | Lindsay | 260—654(D) |
| 3,291,846 | 12/1966 | Otsuka et al. | 260—656 |

FOREIGN PATENTS

| | | | |
|---|---|---|---|
| 462,044 | 12/1949 | Canada | 260—656 |
| 695,297 | 9/1964 | Canada | 260—659(oxy) |
| 735,503 | 5/1966 | Canada | 260—659(oxy) |
| 1,067,597 | 5/1967 | England | 260—656 |

LEON ZITVER, Primary Examiner

J. A. BOSKA, Assistant Examiner

U.S. Cl. X.R.

260—656R, 654A, 659A, 658R